United States Patent
Hung et al.

(10) Patent No.: US 12,118,345 B2
(45) Date of Patent: Oct. 15, 2024

(54) APPLICATION STATUS REPORTING VIA PLATFORM BINARY TABLES

(71) Applicant: Hewlett-Packard Development Company, L.P., Spring, TX (US)

(72) Inventors: Ming Chang Hung, Taipei (TW); Yi-Fan Hsia, Taipei (TW); John Davis Roche, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 47 days.

(21) Appl. No.: 18/002,442

(22) PCT Filed: Aug. 11, 2020

(86) PCT No.: PCT/US2020/045816
§ 371 (c)(1),
(2) Date: Dec. 19, 2022

(87) PCT Pub. No.: WO2022/035426
PCT Pub. Date: Feb. 17, 2022

(65) Prior Publication Data
US 2023/0236819 A1 Jul. 27, 2023

(51) Int. Cl.
*G06F 8/65* (2018.01)
*G06F 9/4401* (2018.01)

(52) U.S. Cl.
CPC ............ *G06F 8/65* (2013.01); *G06F 9/4403* (2013.01)

(58) Field of Classification Search
CPC ........ G06F 8/65; G06F 9/4403; G06F 9/4401; G06F 8/60–68
See application file for complete search history.

(56) References Cited

U.S. PATENT DOCUMENTS

| 6,564,317 | B1 * | 5/2003 | Hale | G06F 9/24 |
| | | | | 712/E9.007 |
| 8,839,231 | B2 * | 9/2014 | Vrhel, Jr. | G06F 8/60 |
| | | | | 717/177 |

(Continued)

FOREIGN PATENT DOCUMENTS

| CN | 110162326 A | 8/2019 |
| CN | 110347414 A | 10/2019 |

(Continued)

OTHER PUBLICATIONS

Microsoft "Tutorial: Implement a Device Firmware Update Process", Microsoft, retrieved from https://docs.microsoft.com/en-us/azure/iot-hub/tutorial-firmware-update, Jun. 28, 2019, pp. 1-15.

*Primary Examiner* — Matthew J Brophy
(74) *Attorney, Agent, or Firm* — Knobbe, Martens, Olson & Bear, LLP

(57) ABSTRACT

Example computing device that may be implemented to report application status via platform binary tables are disclosed. In response to an upgrade log detected during a BIOS initialization, a platform binary table to a management agent stored in a memory is generated. An application status corresponding with the upgrade log is collected during the BIOS initialization. In response to an operating system initialization, the management agent is launched from the platform binary table to report the application status via the management agent. The upgrade log is removed.

14 Claims, 5 Drawing Sheets

(56) References Cited

U.S. PATENT DOCUMENTS

| | | | | |
|---|---|---|---|---|
| 9,063,816 | B2* | 6/2015 | Hobbet | G06F 8/65 |
| 9,858,066 | B2 | 1/2018 | Landry | |
| 10,409,619 | B2* | 9/2019 | Roszak | G06F 8/61 |
| 10,445,106 | B2* | 10/2019 | Roszak | H04L 67/34 |
| 10,635,819 | B2* | 4/2020 | Roszak | G06F 9/4416 |
| 10,740,109 | B2* | 8/2020 | Roszak | G06F 9/4416 |
| 11,093,321 | B1* | 8/2021 | Zeavelou | G06F 11/0793 |
| 11,106,622 | B2* | 8/2021 | Narasimhan | G06F 8/654 |
| 11,347,856 | B2* | 5/2022 | Sayyed | G06F 21/577 |
| 11,755,335 | B2* | 9/2023 | Hung | G06F 8/60 |
| | | | | 713/2 |
| 2007/0220244 | A1* | 9/2007 | Mahmoud | G06F 8/654 |
| | | | | 713/2 |
| 2008/0005733 | A1 | 1/2008 | Ramachandran et al. | |
| 2010/0299749 | A1* | 11/2010 | Bhansali | G06F 21/572 |
| | | | | 726/19 |
| 2011/0197185 | A1* | 8/2011 | Hobbet | G06F 11/1433 |
| | | | | 711/E12.001 |
| 2014/0250430 | A1 | 9/2014 | Proud | |
| 2016/0202964 | A1* | 7/2016 | Butcher | G06F 8/654 |
| | | | | 717/172 |
| 2016/0255139 | A1 | 9/2016 | Rathod | |
| 2016/0328580 | A1 | 11/2016 | Bhansali et al. | |
| 2017/0094226 | A1 | 3/2017 | Guzik | |
| 2017/0131994 | A1 | 5/2017 | Middleton et al. | |
| 2017/0286086 | A1* | 10/2017 | Narasimhan | G06F 8/654 |
| 2018/0276000 | A1* | 9/2018 | Roszak | G06F 9/4401 |
| 2018/0276001 | A1* | 9/2018 | Roszak | G06F 9/452 |
| 2018/0276386 | A1* | 9/2018 | Roszak | G06F 9/4416 |
| 2020/0026505 | A1 | 1/2020 | Olderdissen | |
| 2020/0142683 | A1* | 5/2020 | Rao | G06F 9/4411 |
| 2020/0210203 | A1* | 7/2020 | Madala | G06F 8/65 |
| 2020/0349009 | A1* | 11/2020 | Samuel | G06F 11/1469 |
| 2020/0351150 | A1* | 11/2020 | Sethi | H04L 43/12 |
| 2020/0356357 | A1* | 11/2020 | Narasimhan | G06F 15/167 |
| 2020/0372156 | A1* | 11/2020 | Sayyed | G06F 21/577 |
| 2021/0240545 | A1* | 8/2021 | Kumar | G06F 9/4406 |
| 2022/0004636 | A1* | 1/2022 | Walker | G06F 21/572 |
| 2022/0050690 | A1* | 2/2022 | Bhaskar | G06F 9/4411 |
| 2023/0305833 | A1* | 9/2023 | Zhang | G06F 9/4418 |

FOREIGN PATENT DOCUMENTS

| | | | | |
|---|---|---|---|---|
| WO | WO-2018175655 A1 * | 9/2018 | | G06F 11/14 |
| WO | WO-2022035426 A1 * | 2/2022 | | G06F 8/65 |

* cited by examiner

APPLICATION STATUS REPORTING VIA PLATFORM BINARY TABLES

BACKGROUND

Application maintenance in the context of software engineering includes modification of an application or program product after delivery for purposes that may include to correct faults, to improve performance, and to enhance functionality. Application maintenance can be applied via an update, or a patch, as a set of changes to the application that may be installed on computing devices with the application and stored in memory. Often, patches are provided via computer networks. In some examples, application maintenance includes provisioning new application images via patches rather than applying differences to a previous version of the application. Patches may be installed under program control, and computing devices may be equipped with automatic or semi-automatic updating facilities.

DETAILED DESCRIPTION

In some examples, information technology managers or administrators may desire to track application updates provided to members of enterprise. For instance, administrators may seek to track compliance with application updates to determine which, if any, computing devices have yet to apply the patches. In one example, an administrator may contact the provider of the patch, often outside of the enterprise, for information regarding enterprise computing devices that have applied the patch. In another example, management applications can be installed in computer storage and executed during operating system runtimes, like user applications, on each enterprise computing device that may report update compliance to the administrator.

Figure 1:
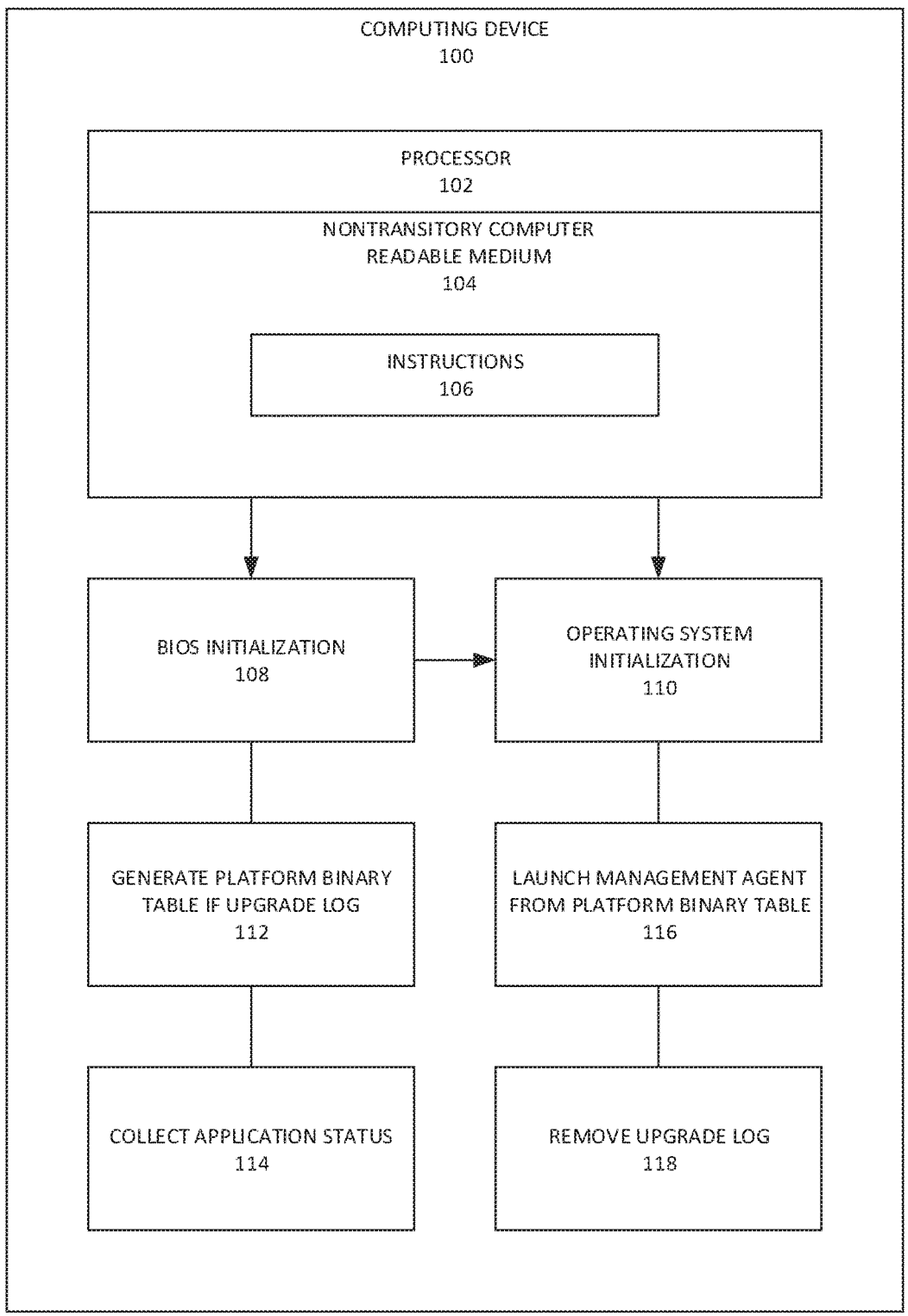
FIG. 1 is a block diagram illustrating an example computing device to report application status via platform binary tables.

FIG. 1 illustrates an example computing device 100. The example computing device 100 can be implemented as a processor 102 and a non-transitory computer readable medium 104 comprising instructions 106. The computing device 100 can include hardware devices, programs, or hardware devices and programs. In one example, the processor can perform a BIOS initialization at 108, such as upon reset of the computing device, and an operating system initialization at 110, such as subsequent the BIOS initialization. The non-transitory computer readable medium 104 can include a memory device, or memory, to store the computer executable instructions 106 that when executed cause the processor 102 to perform a method. In one example, the computer executable instructions 106 cause the processor 102, in response to an upgrade log detected during the BIOS initialization at 108, to generate a platform binary table to a management agent stored in memory at 112 and collect an application status corresponding with the upgrade log at 114 during the BIOS initialization. In response to the operating system initialization at 110, the management agent is launched from the platform binary table at 116. The management agent can report the application status. The upgrade log can be removed at 118.

As used in this disclosure, a basic input/output system (BIOS) refers to hardware or hardware and instructions to initialize, control, or operate a computing device prior to execution of an operating system of the computing device. Instructions included within a BIOS may be software, firmware, microcode, or other programming that defines or controls functionality or operation of a BIOS. In one example, a BIOS may be implemented using instructions, such as platform firmware of a computing device, executable by a processor. A BIOS may operate or execute prior to the execution of the operating system of a computing device. A BIOS may initialize, control, or operate components such as hardware components of a computing device and may load or boot the operating system of computing device.

In some examples, a BIOS may provide or establish an interface between hardware devices or platform firmware of the computing device and an operating system of the computing device, via which the operating system of the computing device may control or operate hardware devices or platform firmware of the computing device. In some examples, a BIOS may implement the Unified Extensible Firmware Interface (UEFI) specification or another specification or standard for initializing, controlling, or operating a computing device.

The upgrade log can be generated in response applying a patch to an application on the computing device 100. In one example, the patch may be applied during the BIOS initialization. In response to applying the patch and generating the upgrade log, the computing device may be reset, such as automatically reset to perform the BIOS initialization 108. In one example, the upgrade log is a selected value of a variable stored in memory; an upgrade log is generated and present in memory if the variable is set at the selected value such as a first value, an upgrade log is not generated, and the upgrade log is not present if the variable set a second value that is not the selected or first value. The variable, or memory location of the variable, may correspond with the application, and the presence of the upgrade log indicates that the patch has been applied to the application.

In one example, the BIOS initialization at 108 can proceed via a plurality of phases prior to the operating system initialization at 110. If no patch is installed during the BIOS initialization and no upgrade log is detected, the BIOS initialization may proceed to the operating system initialization and the operating system runtime. If the upgrade log is detected during the BIOS initialization, the platform binary table is generated at 112. The platform binary table may be generated in response to the detected upgrade log during any phase of the BIOS initialization at 108. In an example implementation, the platform binary table is generated subsequent to loading a driver in a driver execution environment phase of the BIOS initialization. The platform binary table, in one example, is a table in memory in accordance with an Advanced Configuration and Power Interface specification that enables platform firmware to provide the operating system with a platform binary of the management agent that the operating system can execute. In one example, the platform binary table includes a physical address pointer to an image of the management agent that was copied into memory during the BIOS initialization. In this example, the platform binary table to the management agent is a platform binary table pointing to the management agent. The management agent in the example is stored with the platform firmware, such as in nonvolatile memory, and the binary pointed to with the platform binary table is part of the platform firmware image.

In addition to generating the platform binary table at 112 if the upgrade log is detected, the application status is collected during the BIOS initialization at 114 if the upgrade log is detected. Application status can include information regarding the application that corresponds with the upgrade log, or the updated application, such as version number of the updated application and date or time of the patch was applied to the updated application. This information can be determined during the BIOS initialization at 108, and stored in memory at 114 for access by the management agent.

If the operating system, such as the operating system kernel in one example, observes, detects, or determines the presence of the platform binary table during the operating system initialization at 110, the management agent is launched from the platform binary table at 116. If the platform binary table is not generated during the BIOS initialization, the platform binary table is not present during the operating system initialization. The management agent applies the application status and generates a report that can be provided to an administrator. The report, for example, can be used to determine such information as update compliance. In one example, the management agent removes the upgrade log. For example, the upgrade log is removed if the variable set to a second value that is not the selected or first value. The management agent is then closed.

If no upgrade log is detected, the platform binary table is not generated, and the management agent is not launched during the operating system initialization. In this example, the management agent is launched if an upgrade log has been detected as generated in response to an application update. The management is not launched if no upgrade log is detected, such as during an operating system initialization that is not subsequent an application update or subsequent an application update that does not generate an upgrade log. With the upgrade log removed at 118 after the management agent reports the application status, the management agent will launch after a subsequent application update that generates an upgrade log.

Figure 2:
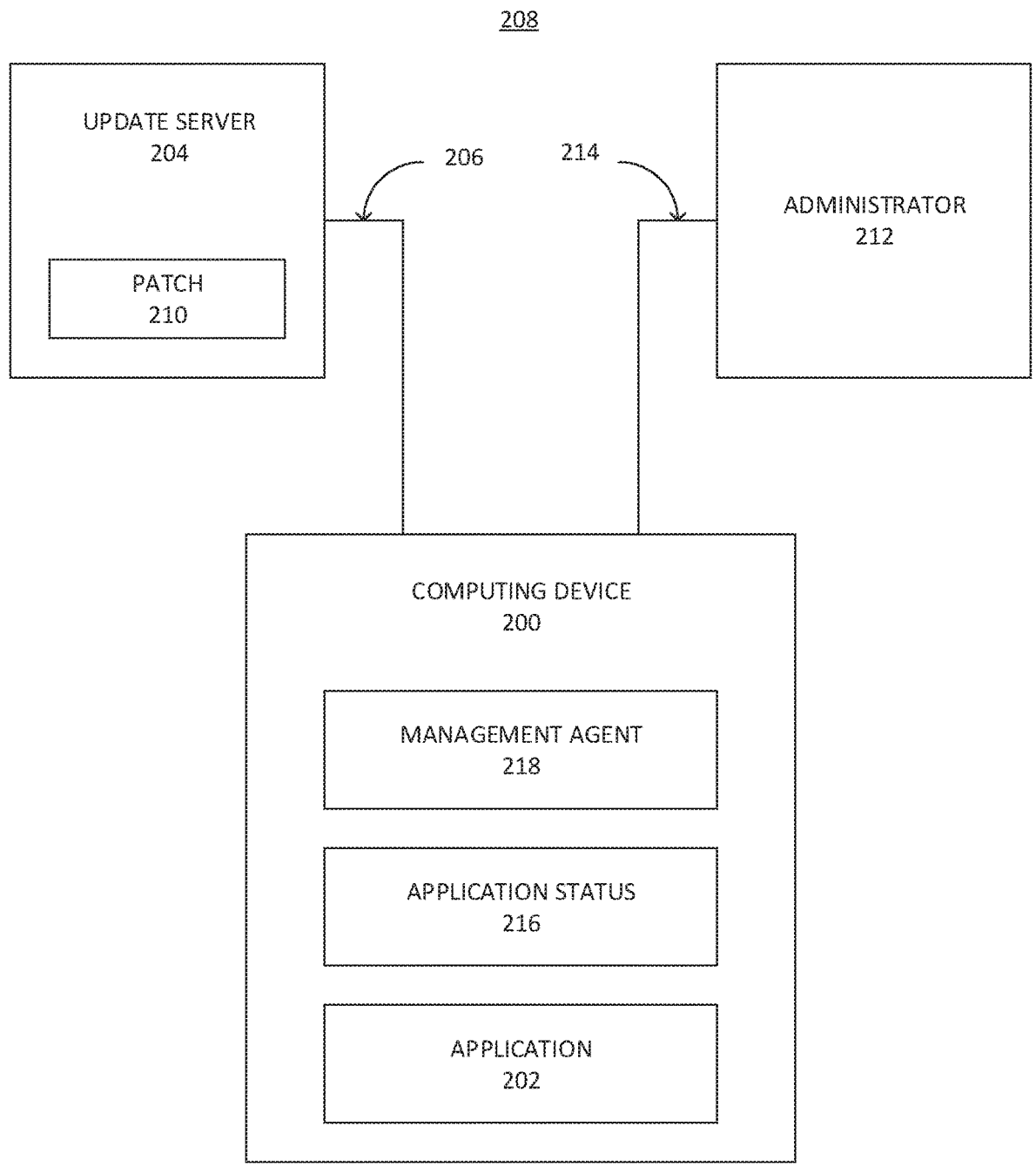
FIG. 2 is a block diagram illustrating an example system including the example computing device of FIG. 2 to report application status via platform binary table.

FIG. 2 illustrates an example computing device 200 that can be used to implement computing device 100. In one example, the computing device 200 can be implemented as a laptop computer, a desktop computer, a tablet computer, a smart phone, a consumer electronic device (such as video game controller or digital video recorder), a peripheral (such as printing device or a network storage device), a server, or a workstation. In such cases, the computing device 200 includes a processor and memory and may include additional components such as display, touchscreen, a network connection, and input devices such as a keyboard. The computing device 200 can include an application 202 stored in memory, and the application 202 may be subject to a patch or update from time to time. Examples of application 202 can include platform applications such as platform firmware, drivers or an operating system and user applications such as word processors or vector graphics editors.

The example computing device 200 is operably couplable to an update device, such as an update server 204 via a network connection 206, which may be included in a network environment 208. The update server 204 may provide patches 210 for the application 202 via the network connection 206. The patch 210, in one example, may include a new application to replace the application 202 rather than to modify the application, such as, for instance, updates to platform firmware. In one example, the update server 204 may be operably coupled to a multiplicity of computing devices via a network, such as the internet, to provide the patch to the application on the computing devices. The network environment 208 can also include an administrator 212 operably couplable to the computing device 200 such as via a network connection 214. In one example, the administrator 212 may be operably coupled to a plurality of computing devices, such as subset of the multiplicity of the computing devices operably coupled to the update server 204, via the internet or an intranet. The administrator 212 may also be operably coupled to update server 204 via a network connection (not shown). In one example, the plurality of computing devices coupled to the administrator may belong to a group such as an enterprise or subscribed to a service provided by the administrator.

The example computing device 200 may include facilities to automatically or semi-automatically install the received patch 210 to update the application 202. In the example, the computing device 200 includes facilities to generate an application status 216 regarding application 202. The application status 216 can include data stored in memory representative of the application version and date the patch 210 was installed. In one example, the application status 216 can be generated or updated in response to the patch 210 installed on the computing device 200. The example computing device 200 includes a management agent 218 stored in memory. The management agent 218 can report the application status 216, such as generate a report based on the application status 216. For example, the management agent 218 can be launched from memory in response to a patch 210 installed on the computing device 200. Once launched, the management agent 218 can access the application status 216 and generate the report based on the application status 216. The report may be provided to the administrator 212 such as via the network connection 214. In one example, the administrator may receive reports from the plurality of computing devices of the enterprise and determine such information as adoption rates of the patch, which computing devices have installed the patch, and whether a computing device includes the latest version of the application.

Figure 3:
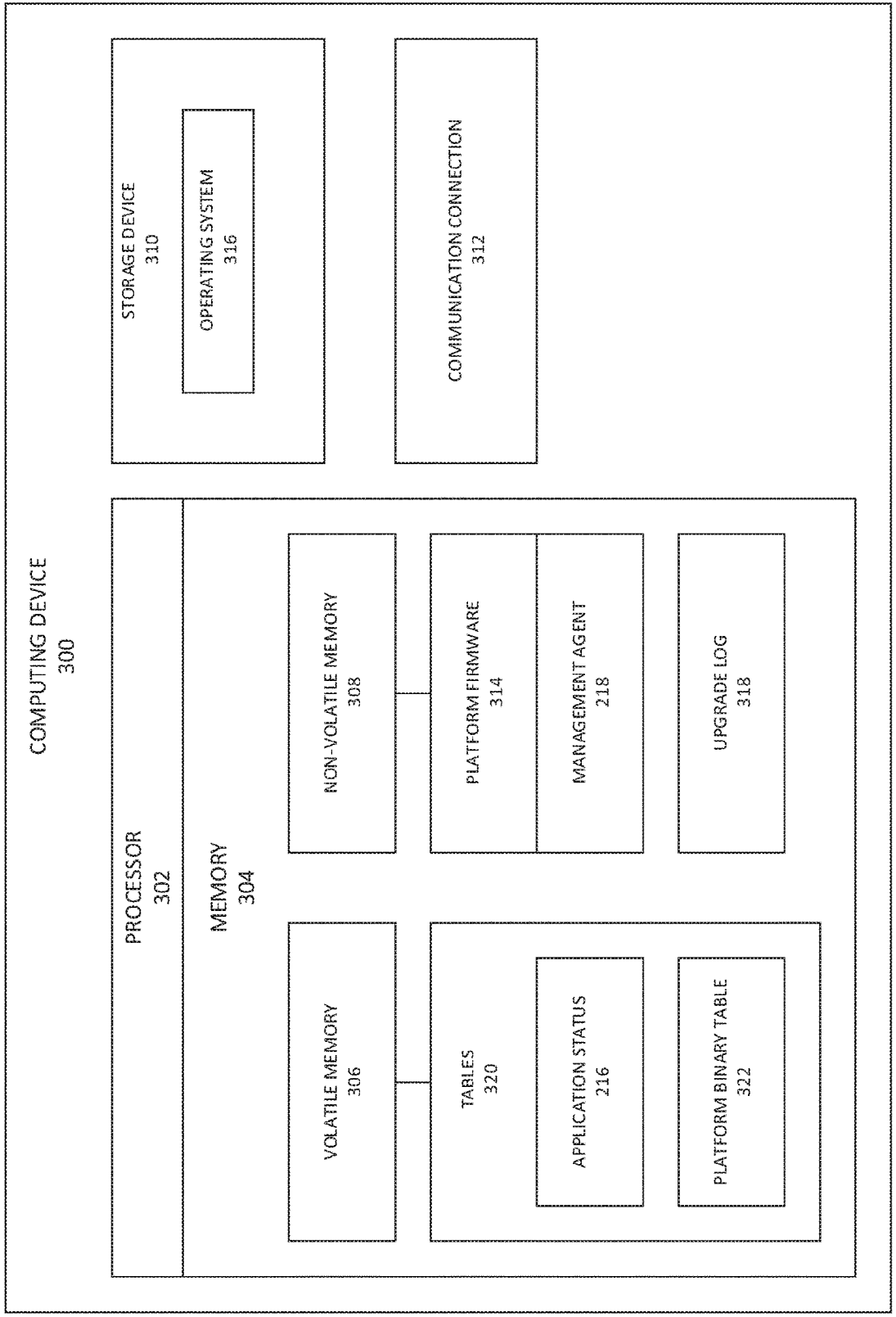
FIG. 3 is a block diagram illustrating another example computing device to implement the example computing device of FIG. 1.

FIG. 3 illustrates an example computing device 300 that can be used to implement computing device 200. In an example hardware implementation, computing device 300 includes a processor system having one or more processing units such as processor 302, and memory 304 accessible by the processor 302. By way of example, the processing units may include two or more processing cores on a chip or two or more processor chips. In some examples, the computing device 300 can also have one or more additional processing or specialized processors (not shown), such as a graphics processor for general-purpose computing on graphics processor units, to perform processing functions offloaded from the processor 302. The memory 304 may be arranged in a hierarchy and may include one or more levels of cache. Depending on the configuration and type of computing device, memory 304 may be volatile (such as random access memory (RAM)), non-volatile (such as read only memory (ROM) or flash memory), or a combination of volatile and non-volatile memory. Memory 304 is an example of computer storage media. In the illustrated example, memory 304 includes volatile memory 306 and non-volatile memory 308.

Computing device 300 may also have additional features or components. For example, computing device 300 may include additional computer storage 310. Computer storage 310 may be removable or non-removable and can include magnetic disks, optical discs, and solid-state memory such as flash storage. Examples of removable storage can include universal serial bus (USB) flash drives, and memory cards. Accordingly, a propagating signal by itself does not qualify as storage media. Memory 304 and computer storage 310 are examples of non-transitory computer readable media that may comprise instructions and data that when executed can control the processor 302 including causing the process to, for example, perform a process.

Computing device 300 may also include input and output connections, such as USB connections, to connect to various devices to receive inputs and provide outputs. Computing device 300 may include, or may be couplable to, input devices and output devices. Input devices may include a keyboard, pointing devices (such as a mouse and trackpad), stylus, touchscreen, and voice input device. Output devices may include a display, speakers, and printing devices.

The illustrated computing device 300 includes a communication connection 312 that allows computing device 300 to communicate with other computing devices, peripheral devices, or applications. Example communication connections include an Ethernet interface, a wireless interface, a bus interface, a storage area network interface, and a proprietary interface. In one example, the communication connection 312 can be used to couple the computing device 300 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, an intranet, and the internet.

Computing device 300 can include applications in the form of computer executable instructions and data stored in the memory 304 and the computer storage 310. For example, memory 304 can include platform firmware 314 for use with the BIOS. The platform firmware can be stored in the non-volatile memory 308. An operating system 316 for the computing device 300 and user applications can be stored on the computer storage 310. In the example computing device 300, management agent 218 in the form of a binary is also stored on the non-volatile memory 308 rather than the computer storage 310 with user applications. In one example, the management agent 218 is included as part of the platform firmware 314 non-volatile image.

In response to an application update, which may include as a patch installed to an application on the computing device, such as an update to the platform firmware 314, instructions executed by the processor 302 may create an upgrade log 318 in memory 304. In one example, the upgrade log 318 is an integral data type generated via an application update facility and stored in memory 304. For instance, a platform firmware updater, which may be included as part of the platform firmware, can be used to generate a UInt64 value in a variable stored in the non-volatile memory 308 in response to an update of the platform firmware 314. In this instance, bit 0 of the variable can be set to a selected value to indicate that the platform firmware has been updated and has yet to be reported via the management agent 218.

Computing device 300 can include mechanisms to pass information from the BIOS to the operating system 316, such as an operating system kernel of operating system 316. In one example, such a mechanism can include tables 320 in memory 304, such as a table constructed according to an Advanced Configuration and Power Interface, or ACPI, specification, or an ACPI table. For example, table structures and headers, including ID and checksum fields, are defined in or about ACPI 5.0 specification (2013) and later, such as ACPI 6.3 specification (2019). In one example, computing devices can implement an ACPI table so the operating system 316 can discover and apply hardware components, perform power management such as putting unused components to a sleep status, and perform status monitoring. The tables 320 can present information regarding the components and operation of the components to the operating system kernel through the platform firmware 314, which the operating system kernel can parse. In one example, the platform firmware 314, via instructions implemented with the processor 302, constructs table values of information regarding aspects of the computer device 300 in tables 320 during BIOS initialization. The operating system 316 can examine the tables 320, via instructions implemented with the processor 302, during the operating system initialization to discover information regarding computing device 300, such as what hardware is installed in the computing device 300 and how it is connected in the computing device 300. In one example, application status 216 can be stored in a table of tables 320 via instructions implemented with the processor 302. In the example of application status 216 including information regarding platform firmware 314, the platform firmware 314 or other components of computing device 300, platform firmware 314 includes instructions implemented with the processor 302 to generate application status 216. Tables 320 may be stored in volatile memory 306.

In one example, tables 320 can include an operating-system defined table, such as an ACPI table, that includes information regarding a platform-firmware-embedded executable, or platform binary table 322. In this example, the operating system, via instructions implemented with the processor 302, can search the memory 304 for a platform binary table 322, such as during operating system initialization, and, if a platform binary table 322 is discovered, the operating system can run the executable. An example of a platform binary table 322 is available under the trade designation Windows Platform Binary Table, or WPBT, for use with the operating system available under the trade designation Windows from Microsoft Corporation of Washington, U.S.A. The WPBT is a fixed ACPI table that enables the platform firmware 314 to provide the Windows operating system with a platform binary, such as management agent 218 that the operating system 316 can execute. The binary handoff medium is memory 304 so the platform firmware 314 can provide the management agent 218 without modifying the operating system 316 on the computer storage 310. In one example, the platform binary table 322 includes a physical address pointer to an executable image of the management agent 218, such as a portable executable image, that the platform firmware 314 via instructions implemented with the processor 302 has copied into memory 304, such as volatile memory 306.

For instance, the binary of management agent 218 can be shadowed to memory 304 as part of the initialization of the platform firmware 314, or the management agent 218 can be loaded into memory 304 by extensible instructions to the platform firmware 314 prior to executing the operating system 316. The platform firmware 314 may create the platform binary table 322 based on the memory location of the management agent 218. During initialization of the operating system 316, the operating system 316 may read the platform binary table 322 to obtain the location of the management agent 218 in memory 304. In one example the management agent 218 is a native, user-mode application executed by an operating system session manager during initialization of the operating system 316. The operating system 316 may write an image of the management agent 218 to the computer storage, and an operating system session manager will launch the management agent. The operating system 316 may reclaim the location of memory 304 described in the platform binary table 322. During operating system initialization of the Windows operating system, the operating system attempts to detect a WPBT. If a WPBT is detected, the operating system copies the executable onto the filesystem and runs the executable.

Figure 4:
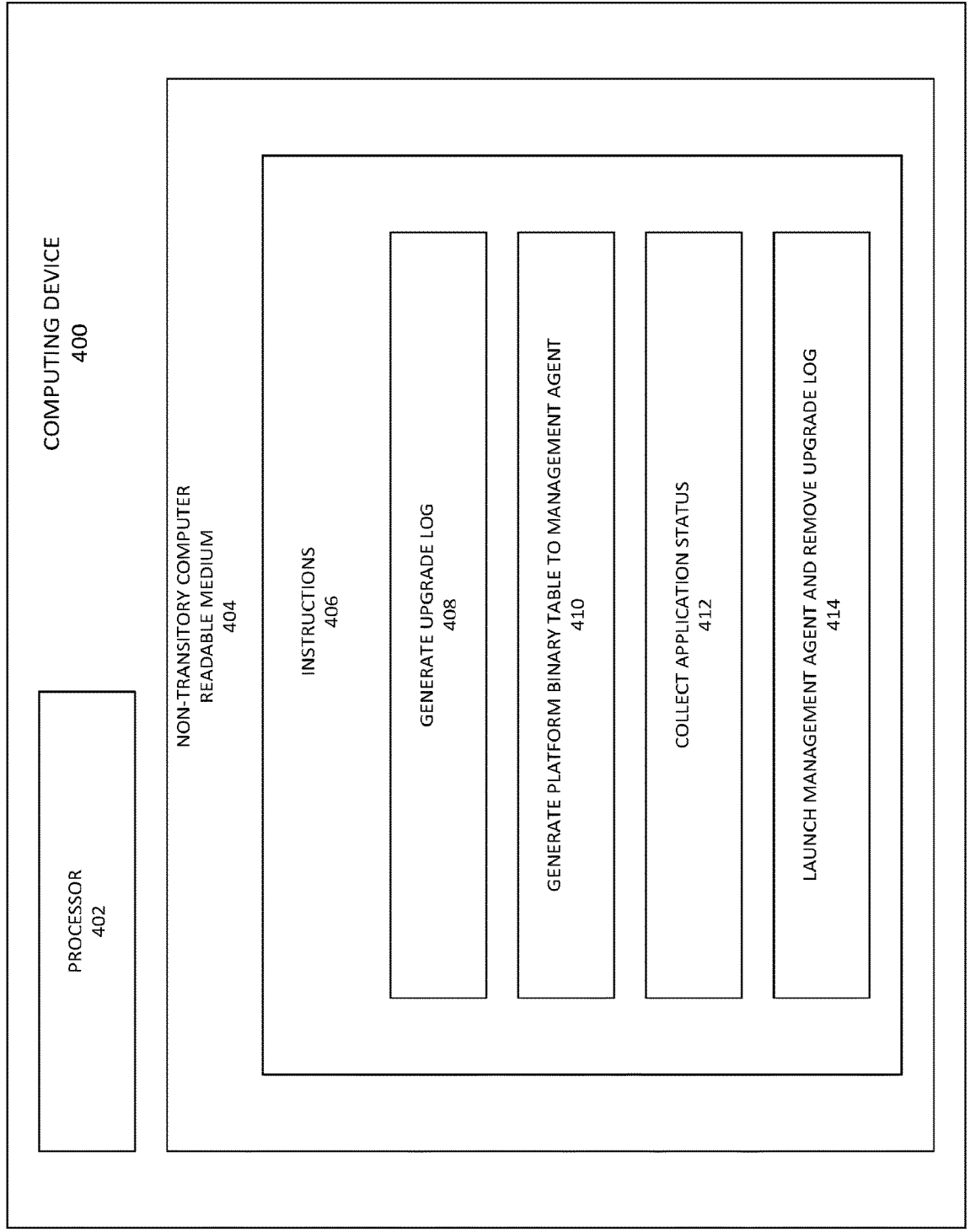
FIG. 4 is a block diagram illustrating another example computing device that may be used to implement the example computing device of FIG. 3.

FIG. 4 illustrates an example computing device 400. In one example, may be used to implement computing device 300. The example computing device 400 can include a processor 402 and a non-transitory computer readable medium 404 comprising instructions 406. In one example, the processor 402 and non-transitory computer readable medium 404 can correspond with processor 302 and memory 304, respectively. The computing device 400 can include hardware devices, programs, or hardware devices and programs. For example, the non-transitory computer readable medium 404 can include a memory device to store the computer executable instructions 406 that when executed cause the processor 402 to perform a method. For example, portions of the computer executable instructions 406 can be included in the platform firmware 314, management agent 218, and operating system 316 loaded into memory 304 or accessed from computer storage 310. The computer executable instructions 406 can apply the upgrade log 318 and tables 320 such as the application status 216 and platform binary table 322. Additionally, computer executable instructions 406 can be implemented with communication connection 312. In one example, the computer executable instructions 406 cause the processor 402 to generate the upgrade log 318 in response to an application update at 408. In response to the upgrade log 318 detected during a BIOS initialization, the computer executable instructions 406 can cause the processor 402 to generate the platform binary table 322 to the management agent 218 stored in memory 304 at 410. Further, the computer executable instructions 406 can cause the processor 402 during the BIOS initialization to collect application status 216 corresponding with the upgrade log 318 of the updated application at 412. During initialization of the operating system 316, such as subsequent to the BIOS initialization, the computer executable instructions 406 can cause the processor 402 to launch the management agent in response to the platform binary table 322 to the management agent 218 to report the application status via the management agent and remove the upgrade log at 414.

Figure 5:
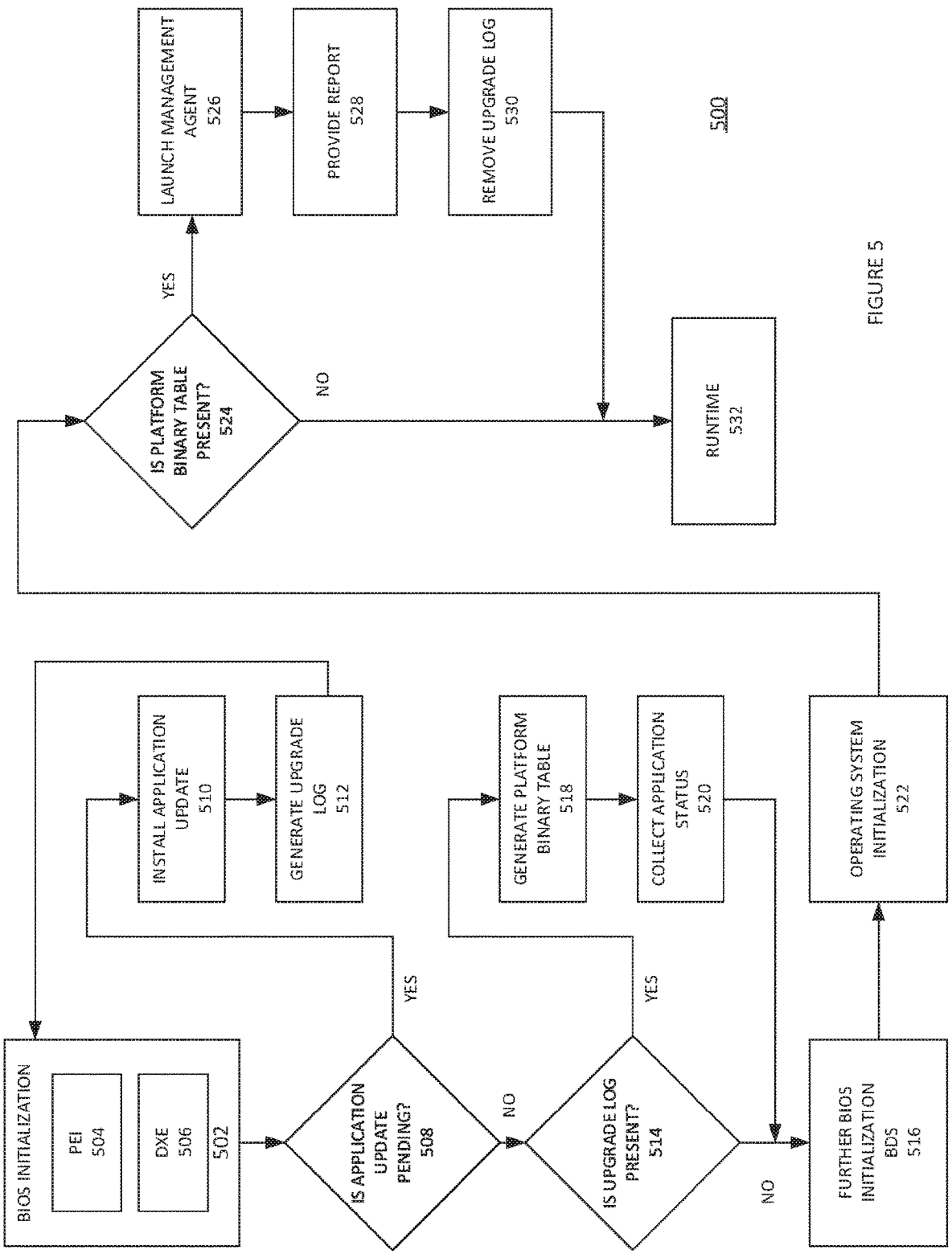
FIG. 5 is a flow diagram illustrating an example aspect of the example computing devices of FIGS. 3 and 4.

FIG. 5 illustrates an example method 500 that may be implemented with the instructions 406 of the non-transitory computer readable medium 404. For illustration, the example method 500 is implemented with instructions 406 that may also be stored on computing device 300 of FIG. 3. In one example, the method 500 may include a BIOS initialization at 502. The BIOS initialization at 502 can proceed via a set of phases including, for illustration, a Security (SEC) phase, a Pre-Extensible firmware Interface (EFI), or PEI, phase 504, and a Driver eXecution Environment (DXE) phase 506. Subsequent to or during DXE phase 506, computer executable instruction may determine whether an application update, such as a firmware update, is pending at 508. If an application update is pending at 508, an updater application may install the application update, such as patch 210 at 510. The upgrade log 318 regarding the patch 210 can be generated, such as an upgrade variable is set to a selected value, in the memory 304 at 512. Method 500 can reset the computing device 300 and begin the BIOS initialization at 502.

If no application update is pending at 508, a determination is made as to whether an upgrade log 318 is present at 514. If no upgrade log 318 is present at 514, such as if the upgrade variable is not set to the selected value or set to another value, the BIOS initialization can proceed such as via a Boot Device Selection, or BDS, at 516. If the upgrade variable indicates an upgrade log is present at 514, a platform binary table 322 is created to the management agent 218 at 518. For example, the platform binary table 322 is created in memory 304 to point to the management agent 218. Additionally, the application status 216, such as the information regarding the application subject to the patch 210, is collected and stored in memory 304, such as a table 320 at 520. The BIOS initialization can proceed such as via a Boot Device Selection, or BDS, at 516.

The operating system boots in an operating system initialization at 522 in which the operating system 316 reads tables 320. If a platform binary table 322 to the management agent 218 is present at 524, the management agent 218 is launched at 526. The application status is stored in memory at 520 so as to be accessible by the management agent 218 when the management agent is launched. at 526. The management agent 218 receives the application status 216 and provides a report at 528, such as via communication connection 312, to the administrator 212. The upgrade log 318 is removed at 530, such as the variable is not set at the selected value or set at a different value than the selected value. The operating system 316 can proceed with runtime at 532. If no platform binary table is present at 524, the operating system initialization at 522 proceeds to runtime at 532.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A non-transitory computer readable medium storing instructions that, when executed by a processor of a computing device, cause the processor to:
    in response to an update to an application of the computing device, generate an upgrade log indicating that the application has been updated;
    during a basic input/output system (BIOS) initialization of the computing device,
        detect a presence of the upgrade log,
        generate a platform binary table to a management agent stored in a memory of the computing device, and
        collect an application status corresponding with the upgrade log during the BIOS initialization, wherein the application status includes information regarding the application that has been updated;
    in response to an operating system initialization, launch the management agent from the platform binary table, wherein the management agent that is launched reports the application status; and
    remove the upgrade log.

2. The non-transitory computer readable medium of claim 1 wherein the upgrade log includes a selected value of a variable stored in the memory.

3. The non-transitory computer readable medium of claim 1 wherein the application status includes information regarding the application that has been updated and data stored in the memory, and wherein the data regards the application updated with a received patch.

4. The non-transitory computer readable medium of claim 1 wherein the platform binary table includes a pointer to the management agent.

5. The non-transitory computer readable medium of claim 1 storing further instructions that, when executed by the processor of the computing device, cause the processor to determine that the platform binary table is present prior to launching the management agent.

6. The non-transitory computer readable medium of claim 1 storing further instructions that, when executed by the processor of the computing device cause the processor to make the application status accessible to the management agent.

7. A computing device comprising:
a processor; and
a memory in communication with the processor and storing instructions that, when executed by the processor, cause the processor to:
in response to an update to an application of the computing device, generate an upgrade log indicating that the application has been updated;
collect an application status corresponding with the update to the application, wherein the application status includes information regarding the application that has been updated;
generate a platform binary table to a management agent stored in the memory during a basic input/output system (BIOS) initialization;
launch the management agent from the platform binary table during an operating system initialization, wherein the management agent that is launched reports the application status; and
remove the upgrade log.

8. The computing device of claim 7 wherein the memory includes a volatile memory and a non-volatile memory, and the management agent is stored in the non-volatile memory and loaded into the volatile memory during the BIOS initialization.

9. The computing device of claim 8 wherein the upgrade log is stored in the non-volatile memory.

10. The computing device of claim 8 wherein platform firmware includes the management agent stored in the non-volatile memory.

11. The computing device of claim 7 further comprising a communication connection operably coupled to the processor.

12. A non-transitory computer readable medium storing instructions that, when executed by a processor of a computing device, cause the processor to:
in response to an update to an application of the computing device, generate an upgrade log indicating that the application has been updated;
during a basic input/output system (BIOS) initialization of the computing device,
detect a presence of the upgrade log,
generate a platform binary table to a management agent stored in a memory of the computing device, and
collect an application status corresponding with the upgrade log during the BIOS initialization, wherein the application status includes information regarding the application that has been updated;
in response to the platform binary table to the management agent present during an operating system initialization, launch the management agent, wherein the management agent that is launched reports the application status; and
remove the upgrade log.

13. The non-transitory computer readable medium of claim 12 wherein the management agent that is launched reports the application status to an administrator operably coupled to the computing device via a network.

14. The non-transitory computer readable medium of claim 12 wherein the operating system initialization proceeds to an operating system runtime after the upgrade log is removed.

* * * * *